(12) United States Patent
Koc et al.

(10) Patent No.: US 7,134,584 B2
(45) Date of Patent: Nov. 14, 2006

(54) CONTROL METHOD FOR GUIDING THE MOVEMENT OF MATERIALS TO BE TRANSPORTED

(75) Inventors: Hakan Koc, Erlangen (DE); Raimund Kram, Erlangen (DE); Richard Schneider, Erlangen (DE); Günter Weber, Heideck (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/941,557

(22) Filed: Sep. 15, 2004

(65) Prior Publication Data

US 2005/0167461 A1 Aug. 4, 2005

(30) Foreign Application Priority Data

Sep. 15, 2003 (DE) ................. 103 42 560

(51) Int. Cl.
*B65H 26/00* (2006.01)
*B65H 20/24* (2006.01)

(52) U.S. Cl. ............................ 226/24; 226/43; 226/45; 226/111

(58) Field of Classification Search .................. 226/24, 226/42, 43, 45, 4, 8, 11, 115, 117, 136, 139
See application file for complete search history.

(56) References Cited

U.S. PATENT DOCUMENTS 3,606,117 A 9/1971 Fagan et al.
3,887,122 A 6/1975 Sommeria
5,833,105 A 11/1998 Stuber
5,918,787 A 7/1999 Hecky

FOREIGN PATENT DOCUMENTS

DE 11 09 249 A1 6/1961
DE 100 09 198 A1 8/2001

*Primary Examiner*—Emmanuel Marcelo
*Assistant Examiner*—Evan H. Langdon
(74) *Attorney, Agent, or Firm*—White & Case LLP

(57) ABSTRACT

The invention relates to an open-loop control process for the motional guidance of conveyed material (32) in a conveying device (30) and to a corresponding conveying device (30). The conveying device (30) has a movable means (36) for realizing the conveyance and a first motion detector (42) for measuring a first actual position value ($x1_{act}$) for the movable means (36) and a second motion detector (40) for measuring a second actual position value ($x2_{act}$) for the conveyed material (32). The control is herein realized with a position control having a position control clock ($T_{pc}$) and with a speed control (GR) having a relatively faster speed control clock ($T_{sc}$), in which, in the position control clock ($T_{pc}$), desired position values ($x_{cmd}$) are preset as the command variable and, in the speed control clock ($T_{sc}$), registered first actual position values ($x1_{act}$) are fed back to the position control, in which the position control is provided, at least in part, in an open-loop control part (NC) and the speed control (GR) is provided in a drive part (A), and in which a control variable (R) is fed back into the position control, which control variable is dependent on second actual position values ($x2_{act}$) registered in the position control clock ($T_{pc}$). A high accuracy and dynamic can thereby be obtained.

3 Claims, 7 Drawing Sheets

CONTROL METHOD FOR GUIDING THE MOVEMENT OF MATERIALS TO BE TRANSPORTED

FIELD OF THE INVENTION

The invention relates to a conveying device for a conveyed material and to a process for realizing a conveyance of a material to be conveyed.

BACKGROUND OF THE INVENTION

Conveying devices are used, in particular, in production machinery. Production machinery comprises, for example, packing machines, presses, printing presses, plastics injection molding machines and the like. A lot of such production machinery requires a high dynamic. For this reason, the dynamic of a control for this machinery is most important. Especially where rapid and precise conveying operations are to be performed, an accurate and precise control of the conveyance of the conveyed material is necessary. The conveyed material is, for example, a sheet metal, a wooden board, a foil, etc.

SUMMARY OF THE INVENTION

The object of the present invention is therefore to provide an open-loop control process and an associated control structure with which the dynamic of a position control loop can be increased, whereby a higher disturbance variable suppression and, in conjunction therewith, a higher dynamic rigidity of the position control loop is achieved.

This object is achieved by an open-loop control process for the motional guidance of conveyed material, which process has the features as claimed in claim 1. Subclaims 2 to 4 are refinements of the open-loop control process. The object is additionally achieved by means of a conveying device having the features as claimed in claim 5. Subclaims 6 and 7 are inventive refinements of the conveying device.

In an inventive open-loop control process for the motional guidance of conveyed material in a conveying device, the conveying device having:
a) a movable means for realizing the conveyance,
b) a first motion detector for measuring a first actual position value for the movable means and
c) a second motion detector for measuring a second actual position value for the conveyed material, the control is realized with a position control having a position control clock and with a speed control having a relatively faster speed control clock. In the position control clock, desired position values are preset as the command variable and, in the speed control clock, registered first actual position values are fed back to the position control and/or speed control. The position control is herein provided, at least in part, in an open-loop control part, the speed control being provided in a drive part. A control variable is in this case fed back into the position control, which control variable is dependent on second actual position values registered in the position controller clock.

By means of the advantageous apportionment of the controllers (position controller and speed controller) to different clock times, short cycle times and a high dynamic are able to be obtained. The speed controller is, for example, a rotation speed controller in a rotary-working electric machine or, indeed, a linear speed controller in a linear motor. In the case of a press, in particular, the process according to the invention yields advantages in terms of the control dynamic.

A further advantage of the invention can result from the fact that a high dynamic of the system to be controlled is obtainable without the provision of a jolt limiter. A jolt limiter is necessary, in particular, where a slippage is intended to be limited. In the event of a dynamic alteration of the desired value, its time derivation is large. The drawback of a jolt limiter is, however, that this produces a time delay in the desired value. According to the invention, it is now also possible to realize a control with a high dynamic without the need to use a jolt limiter.

The process offers advantages, in particular, in respect of a roller feed, since a rapid speed control loop (speed control) works together with a motor sensor for the speed measurement and a master position control loop (position control) works together with a feed sensor on a feed material. The motor sensor constitutes the first motion detector for measuring the first actual position value for the movable means (feed material). The feed sensor constitutes the second motion detector for measuring the second actual position value for the movable means (feed material).

By means of the process according to the invention, a dynamic control is realized, in which account is taken of the slippage of the conveyed material. If the position control is computed, for example, in a control unit of a drive, then a high scanning rate can be utilized there. In order, however, not to exceed the free computing time in the control unit of the drive, the control is split into a position control and a speed control, the position control being computed in an open-loop control unit. In the open-loop control unit, the position control is processed with a lower scanning rate than in the control unit.

In an advantageous embodiment of the open-loop control process, a difference deriving from the first actual position values registered in the speed control clock and the first actual position values registered in the position control clock is fed back as a control variable to the input side of the speed control.

A further advantageous embodiment of the open-loop control process is obtained if, as the control variable of the position control, the second actual position values registered in the position controller clock are used.

For the open-loop control process, it is additionally advantageous if, as the control variable of the position control, a sum is used, the first actual position values registered in the speed controller clock being used as a first addend and a difference deriving from the registered second actual position values and the registered first actual position values being used as a second addend in the position controller clock.

The invention further relates to a conveying device which has a control device for the realization of the process. The control device has, for example, a drive part (drive device) and an open-loop control part (open-loop control device) of the type described above. The control device can thus consist of two devices (instruments). Specifically where this is the case, the process according to the invention has the advantage of a dynamic control, although the control (position control and speed control) is apportioned to two devices (parts) for the control.

The inventive conveying device for a conveyed material thus has, for example:
a) a movable means for realizing the conveyance,
b) a first motion detector for the movable means,
c) a second motion detector for the conveyed material, and
d) a control system.

The control system has an auxiliary controller and a main controller, the auxiliary controller being able to be intended for a first control variable deriving from the first motion detector and the main controller being able to be intended for a second control variable deriving from the second motion detector.

The conveying device for the conveyed material is particularly intended for a press. The conveying device is constructed, for example, as a roller feed, especially for a press.

The motion of the conveyed material is registered directly or indirectly, for example, at least twice. On the one hand, the motion is registered, for example, indirectly by means of the movable means for realizing the conveyance. Examples of movable means for realizing the conveyance are, for example, at least one or more rollers or, indeed, a chain as means for realizing the conveyance. The motion of the movable means is registered, for example, by a transmitter on the roller itself or, once again, indirectly via the motion detector of a drive, by means of which the movable means, such as, for example, the roller, is moved. The motion of the conveyed material itself is registered directly by means of a second motion detector. This is effected, for example, by a measuring wheel which has a transmitter, or indeed by another means, such as, for example, a laser device for determining the speed of the conveyed material. The conveying device has a control system for controlling the motion of the conveyed material. The control system has at least one auxiliary controller and one main controller, the auxiliary controller being intended for a first control variable deriving from the first motion detector and the main controller being intended for a second control variable deriving from the second motion detector, the auxiliary controller being used to form an auxiliary control loop and the main controller being used to form a main control loop.

In an advantageous embodiment, the movable means for realizing the conveyance is at least one roller drivable by means of an electric motor.

The electric motor is mechanically coupled with the roller as an electric drive, so that the motion detector of the movable means, i.e. the roller, can be equated with the motion detector of the electric drive. Any gear-dictated transmission ratios present between a rotary motion of the electric motor and a rotary motion of the movable means in the form of the roller shall be taken into account in determining the motion.

In an advantageous embodiment, the conveying device is a feed device, the feed device being intended, in particular, for the loading of a press. In presses it is advantageous to be able to attain very short cycle times, and hence high productivity, in feed assemblies of presses. A feed assembly for a press is, for example, at least one roller feed. The productivity of the press can be improved by optimizing the dynamic of the roller feed, whilst maintaining the required accuracy. The feed assembly, as the conveying device in the form of the roller feed of the press, can be driven by means of an electric motor. The electric motor has, for example, a motor transmitter. The motion of the movable means is defined, i.e. can be established, by the motor transmitter, a transmission ratio of a gear system, for example, having to be taken into account.

The conveyed material, i.e. in the case of the feed device, therefore, the feed material, is moved by means of the movable means, for example at least one feed roller. The feed material is, for example, sheet metal. In the conveyance of the feed material, a misalignment or a slippage can occur if the metal sheet slips in relation to the feed rollers. This slippage or misalignment can be registered, for example, by a measuring wheel or a laser device as the second motion registration means, since two measured speed values are then able to be compared. As a result of the control according to the invention, it is possible to correct such misalignment. The position control and hence the positioning accuracy ultimately takes place at the measurement values of the second motion detector, so that even if there is slippage between the movable means, as drive means for the conveyed material, and the actual feed of the conveyed material, the conveyed material can be accurately positioned.

Inaccurate control methods for a conveying device, especially for a feed device of a press, can thereby be avoided. An example of this is where, for example, when there is no feed material present or, for example, when the feed material, as the conveyed material, is threaded into a roller feed, the motion of the feed material is controlled solely by means of a motion detector of the electric motor for driving the roller feed. After a feed phase, the controller of the conveying device is switched over, for the production, to the transmitter signal of the measuring wheel, for example, so that the position controller, during the production, is closed exclusively by means of the measuring signals of the measuring wheel. This procedure is long-winded and leads to inaccuracies, especially in the switchover phase.

In an advantageous embodiment of the conveying device, the auxiliary controller is at least one differential position controller in the electric drive, especially for the electric motor. The differential position controller is used to construct a differential position control loop. In an open-loop control, for example, the position of the conveyed material is controlled with the aid of the second motion detector for the conveyed material. A master position control loop is thus formed for the position control of that position of the conveyed material which is determined by means of the second motion detector.

In an advantageous embodiment, the open-loop control is integrated in the electric drive. Advantageously, the slave differential position control loop is computed in a lower cycle time than the master position control loop. For example, the slave control loop has a cycle time of 125 μsec, whereas the master control loop has a cycle time of, for example, 1 to 2 msec.

In an advantageous embodiment, the low cycle time can also be used as a pilot control, for example for the speed.

By means of the fast slave control at the first motion detector, for example the motor transmitter, a high rigidity or dynamic in the position control loop, and hence at the movable means, such as, for example, a roller, is attainable. An occurring misalignment between the movable means, especially the drive or a conveying roller, and the conveyed material, especially the feed material, is registered by means of the second motion detector, such as, for example, the measuring wheel, and fed via the master, absolute position comparison into the control of the movable means and hence into the positioning of the movable means. In order further to improve the dynamic, at least one pilot control can be used.

In a further advantageous embodiment, in order to improve the control characteristic, an additional, different weighting factor can be realized or provided in the master position control loop for the specific weighting/dynamic. In this case, different weighting factors or amplification factors between the differential position control loop of the motor system and the absolute control loop can be realized in relation to the measurement values of, for example, the measuring wheel.

The slave control loop forms, in this context, the auxiliary control loop, which has an auxiliary controller, the master control loop having the main controller.

BRIEF DESCRIPTION OF THE FIGURES

Illustrative embodiments of the invention are explained in greater detail below with reference to the drawings, in which.

DETAILED DESCRIPTION OF THE INVENTION

Figure 1:
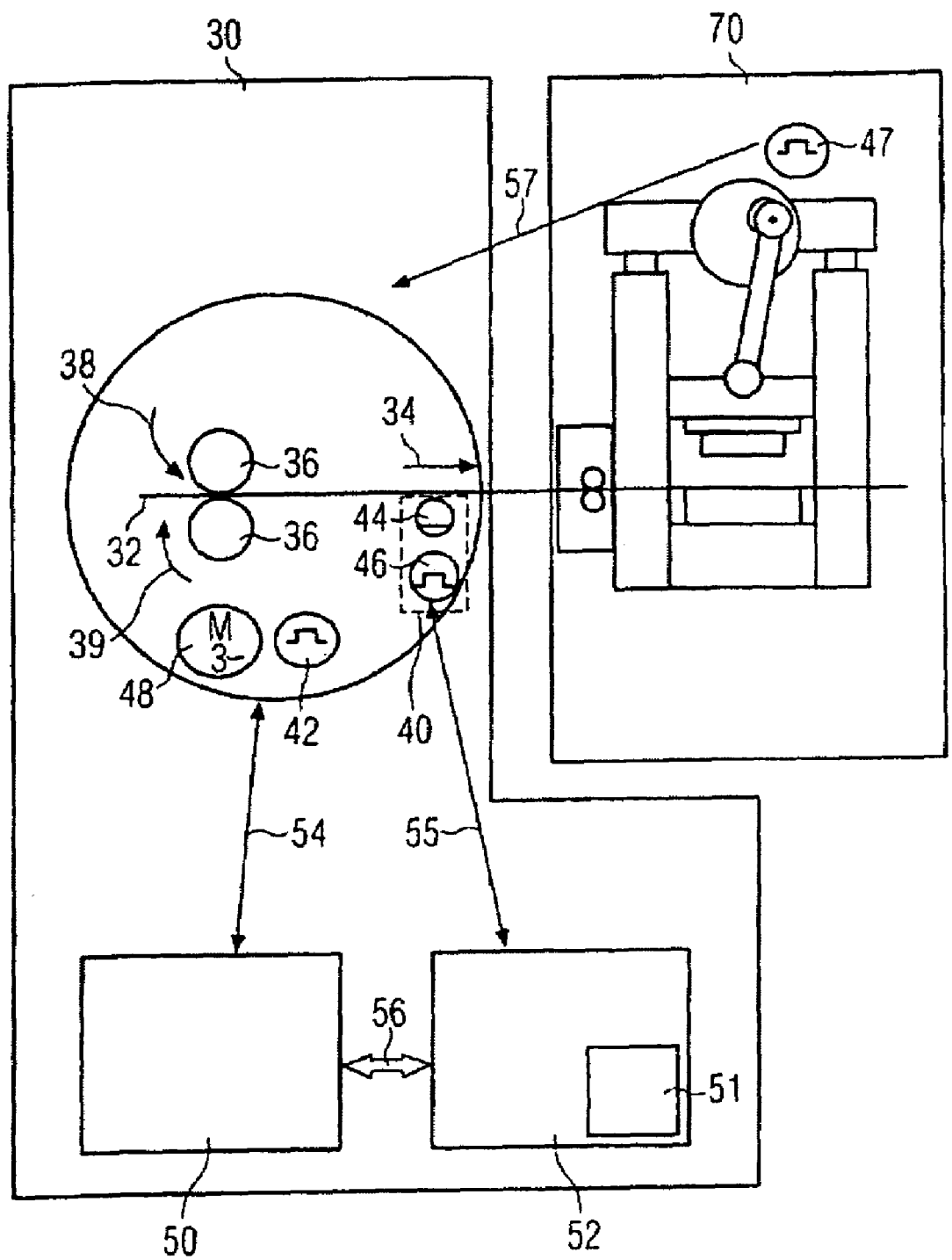
FIG. 1 shows a conveying device 30 together with a press 70.

The representation according to FIG. 1 shows a conveying device 30, which serves to convey a conveyed material 32. The conveyed material 32 is intended for a press 70. The conveying device 30 acts as a feed device for the conveyed material 32, which, for example, is a sheet metal. The conveyed material 32 can be moved by means of movable means 36 in a motional direction 34 displayed by an arrow. The movable means 36 are, for example, feed rollers, the rotational direction 38 and 39 of which is indicated by arrows. The use of feed rollers as movable means 36 means that the conveying device 30 involves, in particular, a roller feed. The movable means 36 can be driven by means of an electric motor 48. The electric motor 48 is connected to a motion detector 42. The motion detector 42 is a first motion detector and acts as a motor measuring system and thus serves to control the electric motor 48. The electric motor 48 is driven by means of a drive 50. The drive has, in addition to a static converter, also a control device, which controls, for example, the current. The drive 50 is connected to an open-loop control 52, this being indicated by an arrow 56. An existing connection, symbolized by an arrow 54, between the drive 50 and the electric motor 48 and/or the motion detector 42 serves merely to illustrate a coupling, this coupling being, for example, of an electrical, mechanical or data systems engineering nature. The conveying device 30 and the electric motor 48 are controlled by means of a control 51. The control 51 is therefore, for example, at least part of the drive 50 and/or can be realized as at least a part of the open-loop control 52. The control 51 can also be integrated into the drive 50, though this is not represented. The drive 50 usually has a faster scanning of signals than is the case with the open-loop control 52.

The motion of the conveyed material 32 is registered, for example, also by means of a measuring wheel 44. The measuring wheel 44 is coupled with a transmitter 46, the signals of the transmitter 46 being transmissible to the open-loop control 52 via a connection, displayed in symbolized representation with an arrow 55, to the open-loop control 52. The measuring wheel 44 acts as a second motion detector. By means of the conveying device 30, the conveyed material 32 can at least be introduced into, and also led out of the press 70. The press 70 has a transmitter 47. The transmitter 47 acts, for example, as a clock generator for the conveying device 30. The conveying device 30 is controlled, for example, in the open-loop control 52 and/or in the drive 50. As a result of an optimized motional guidance and control in respect of the conveying device 30, which acts as a feed assembly for the press 70, the control system according to the invention yields the corresponding advantages in terms of productivity, dynamic, rigidity, whilst maintaining the required position accuracy.

If a differential slave position control loop is used with regard to the control of the electric motor 48, whereby short cycle times are employed in the drive 50, then a high dynamic and rigidity can be obtained. The conveyed material 32 is positioned, for example, by means of an absolute position control loop in the open-loop control 52, using the measurement values of the transmitter 46 on the measuring wheel 44. A high positioning accuracy in relation to the conveyed material to be fed to the press 70 can thereby be obtained. The open-loop control 52 and the drive 50 can also be realized, for example, in a joint system or can be coupled via a digital connection.

The positioning accuracy is in this case dependent on the resolution of the transmitter 46 of the measuring wheel 44. Further drive and control functions, such as, for example, a pilot control for the speed, can also advantageously be used.

Figure 2:
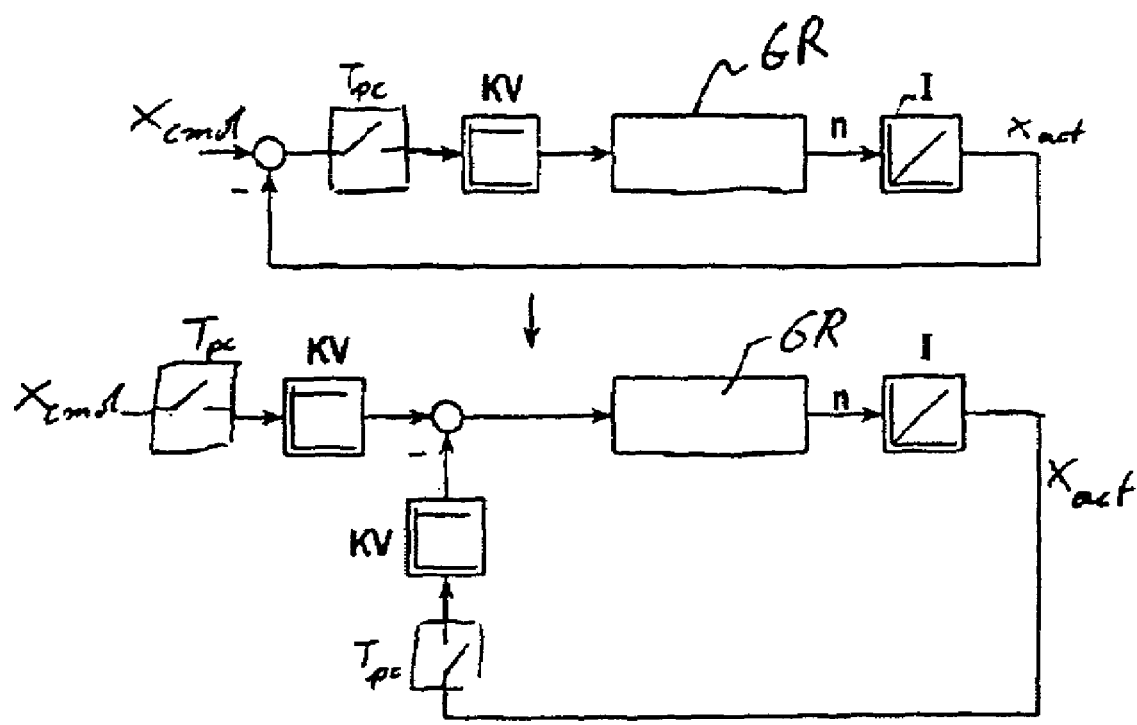
FIG. 2 shows a block diagram of a proportional position control.

In the representation according to FIG. 2, a block diagram of a P-position control (proportional position control), together with the thereto equivalent representation of a state control, is shown. In the top half, the control loop of the P-position control is represented. On the input side, desired position values $x_{cmd}$ are preset as a command variable. Actual position values $x_{act}$ are fed back to this command variable as the control variable and the difference deriving from the two values is formed. This difference is scanned in the position controller clock $T_{pc}$, which in the top half of the representation according to FIG. 1 is illustrated in the form of a switch (scanning element) commanded with $T_{pc}$. These scanned values are fed to a control element KV (amplification element) and from there passed on to a speed controller GR. The latter provides on the output side, for example, a rotation speed n, from which, by means of an integrator I, the aforementioned actual position values $x_{act}$ are derived. The equivalent time constant of the integrator I herein corresponds to the value of the position controller clock $T_{pc}$.

This conventional block diagram of a position control loop is represented in the bottom half of the representation according to FIG. 1 in the form of an equivalent state controller form, the functionality of the two block diagrams being equal.

Said state controller form differs from the previously described conventional form of representation of a position control loop by the fact that the actual position values $x_{act}$ are not fed back before the scanning element with the position control clock $T_{pc}$, but rather to the output of the control element KV. To this end, in the feedback branch for the actual position values $x_{act}$, a further scanning element is provided, which is likewise commanded in the position control clock $T_{pc}$. Connected downstream from the latter is a further control element KV. Thus the equivalent state controller form has a scanning element and a control element not only in the forward branch, but also in the feedback branch for the actual position values.

From this it can plainly be seen that the dynamic of the control loop is influenced solely by the scanning element in the feedback branch, whilst, via the forward branch, only the desired position values $x_{cmd}$ supplied on the input side are made available as the command variable. It can thus be recognized that in the feedback branch scanning proceeds as quickly as possible, whilst for the forward branch it makes very little sense to scan any faster than the closed control loop can follow.

Figure 3:
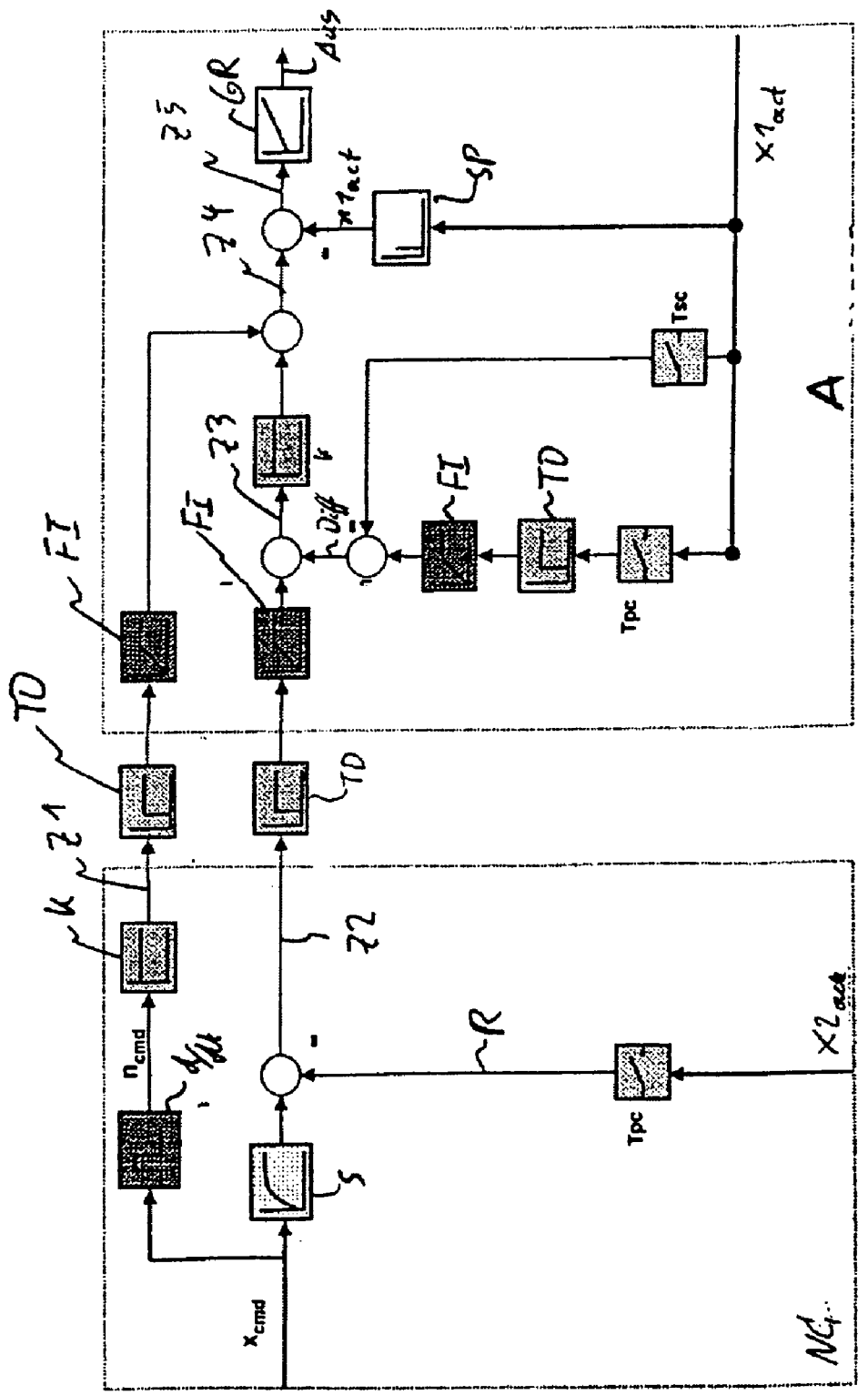
FIG. 3 shows a first dynamic control.

Based on this insight, a control loop as represented in FIG. 3 can therefore be formed. From the desired position value $x_{cmd}$, a desired speed value $n_{cmd}$ is formed by means of a derivation element d/dt and is led through an amplification element K so that a first intermediate value Z1 is formed. The desired position value $x_{cmd}$ is further led, for example, over a symmetry filter S, whereafter, from this value, a control variable R is subtracted and the result of the subtraction forms a second intermediate value Z2. The control variable R is a second actual position value $x2_{ist}$ scanned in a position control clock $T_{pc}$. The second actual position value $x2_{ist}$ originates from the second motion detector, which is represented, by way of example, in FIG. 1. The first and second intermediate values are determined, for example, in an open-loop control part NC. The open-loop control part NC operates, for example, with a cycle time of about 1 ms. The intermediate values Z1 and Z2 are transmitted to a drive unit A. The transmission time necessary thereto is replicated by time delay elements TD.

The drive unit A operates at a faster rate than the open-loop control part NC. A typical cycle time for the drive unit is about 125 μs. Since the rate of the drive unit is faster, the intermediate values Z1, Z2 are firstly interpolated in fine interpolators FI. After this, the second intermediate value Z2 is added to a difference signal Diff, from which a third intermediate value Z3 is obtained. The difference signal Diff is obtained by subtraction of a first actual position value $x1_{act}$, which is scanned in the speed control clock $T_{sc}$, from the first actual position value $x1_{act}$, which is scanned in the position controller clock $T_{pc}$ and which is time-delayed by means of the time delay element TD and subsequently fine-interpolated by means of the fine interpolator FI.

The third intermediate value Z3 is led over an amplification element K, whereafter it is added to the first intermediate value Z1 from the fine interpolator FI to form a fourth intermediate value Z4. From the intermediate value Z4, a first actual rotation speed value $n1_{act}$ is subtracted to form a fifth intermediate value Z5. The first actual rotation speed value $n1_{act}$ is determined in a speed calculation element SP from the first actual position value $x1_{act}$. The first actual position value $x1_{act}$ originates from the first motion detector, which, by way of example, is represented in FIG. 1. The fifth intermediate value Z5 is then led into the speed control element GR (speed controller). From this is obtained the output signal Aus, the position control and the speed control.

Figure 4:
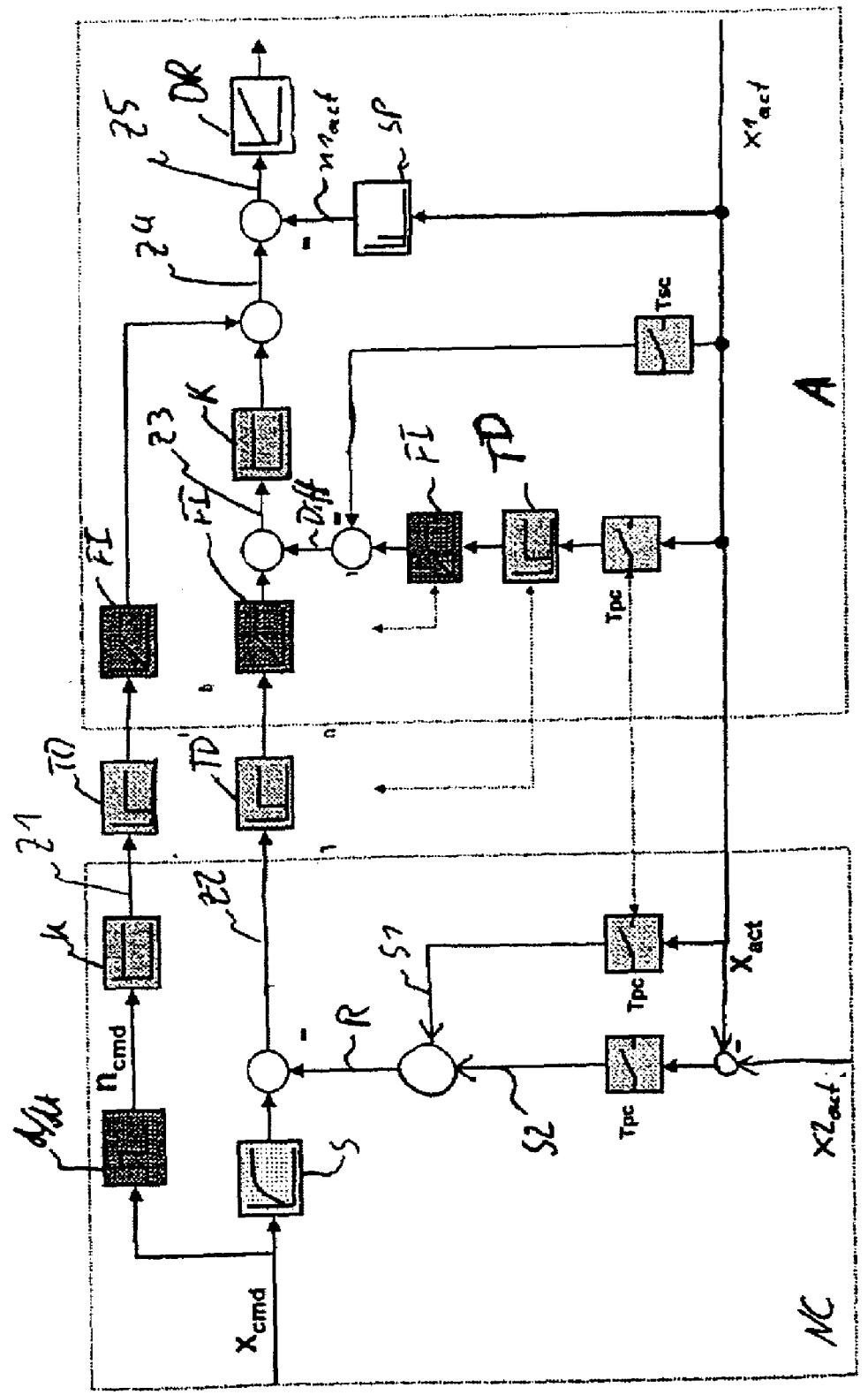
FIG. 4 shows a second dynamic control.

The representation according to FIG. 4 differs from the representation according to FIG. 3 by the fact that, in the open-loop control part NC, the control variable R is formed differently. The control variable R is obtained from the summation of two addends S1 and S2. The addend S1 is formed from the first actual position value $x1_{act}$ scanned in the position control clock $T_{pc}$. The second addend S2 is formed from the difference, scanned in the position control clock $T_{pc}$, between the first actual position value $x1_{act}$ and the second actual position value $x2_{ist}$. The second addend S2 is therefore a slippage.

Figure 5:
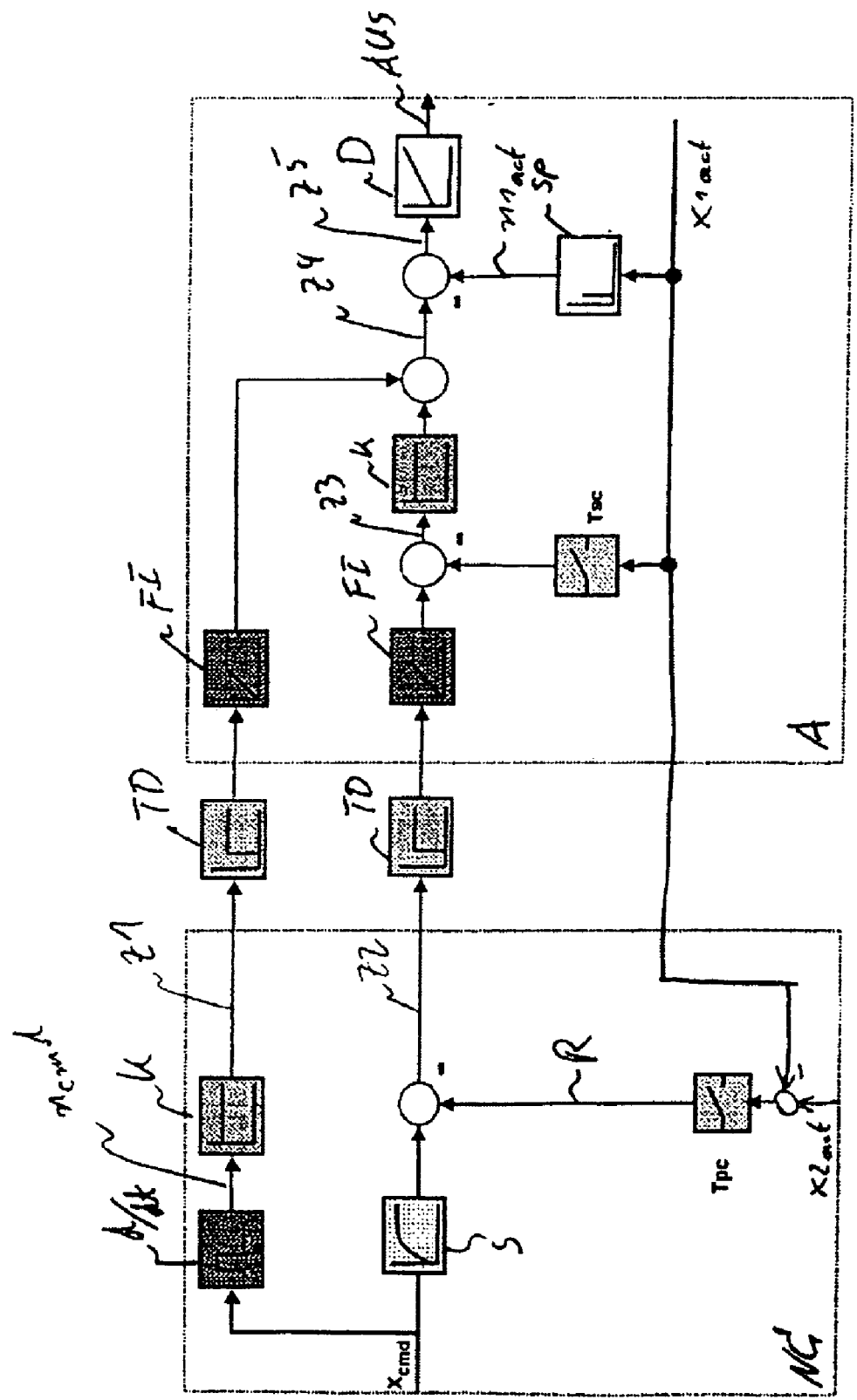
FIG. 5 shows an equivalent representation of the control according to FIG. 4.

The representation according to FIG. 5 is an equivalent representation, in control technology terms, of the control according to FIG. 4. In the drive A, the first actual position value $x1_{ist}$ is led in the speed control clock $T_{sc}$, in a difference-forming manner, to the time-delayed and interpolated intermediate value Z2. In the open-loop control NC, a difference is formed from the first actual position value $x1_{ist}$ and the second actual position value $x2_{ist}$. This difference is scanned in the position control clock $T_{pc}$ and used as a control variable R.

Figure 6:
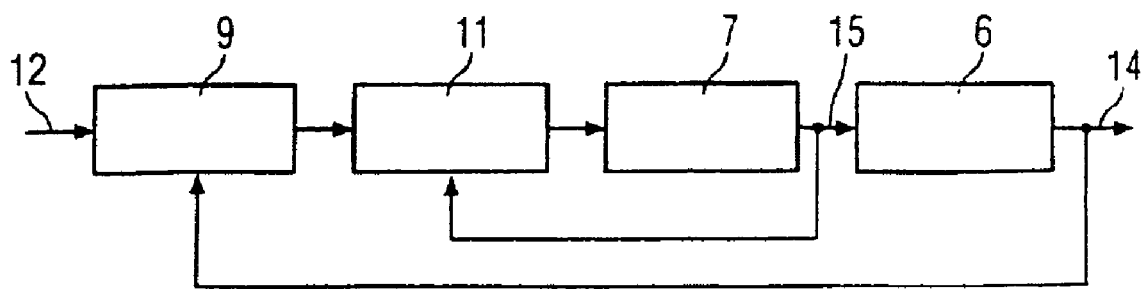
FIG. 6 shows a slave differential position control loop.

The representation according to FIG. 6 shows diagrammatically a further control structure for a conveying device for a conveyed material. In this, an optimized dynamic is achieved by a slave, differential control loop. The representation shows a controlled system 6 and a controlled system 7. The main control variable 14 is the position of the conveyed material. The position of the conveyed material is led to the main controller 9. The main controller 9 is realized, for example, in the open-loop control, forming an absolute position control loop (equivalent to the position control loop) in relation to the motion of the conveyed material recorded, for example, by the measuring wheel 44. A desired value 12 indicates the desired position of the conveyed material. The controlled system 6 comprises the conveyed material feed and the motion detector 40. The controlled system 7 comprises the drive system with electric motor, motor measuring system and the feed rollers 36. An auxiliary control variable 15 of the first motion detector 42, which reproduces the position of the motor, is led to the auxiliary controller 11. The auxiliary controller 11 is realized, for example, in the drive, the auxiliary controller 11 serving to form a differential position control loop for the position control of the electric motor 48.

Figure 7:
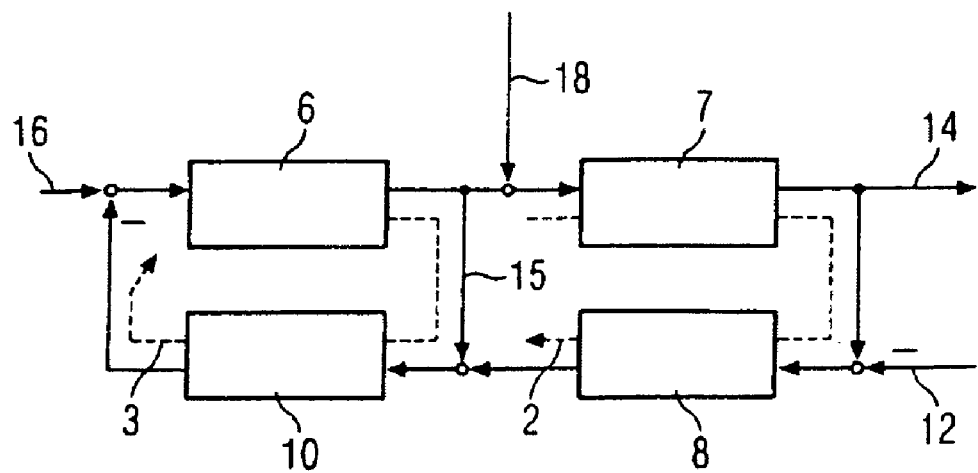
FIG. 7 shows a basic structure of a cascade control.
Figure 8:
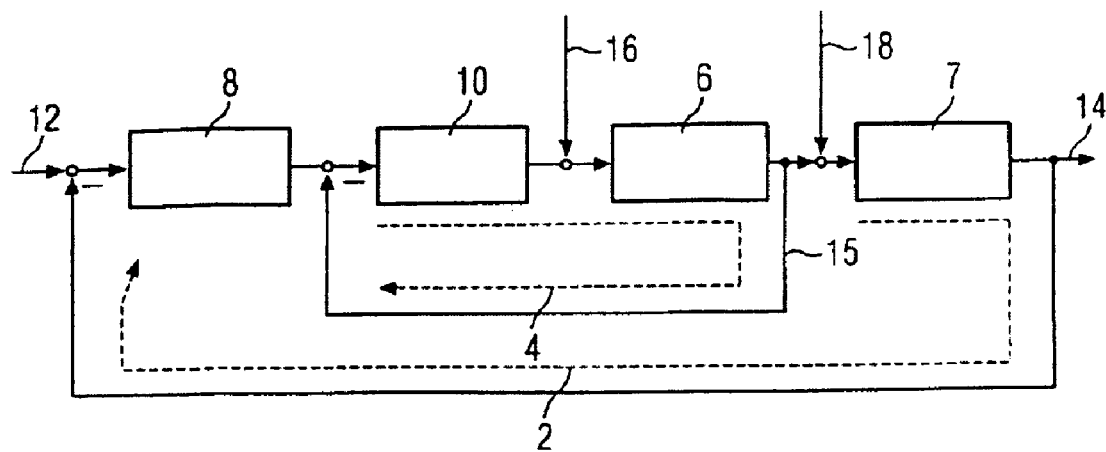
FIG. 8 shows a cascade control with use of a control difference.
Figure 9:
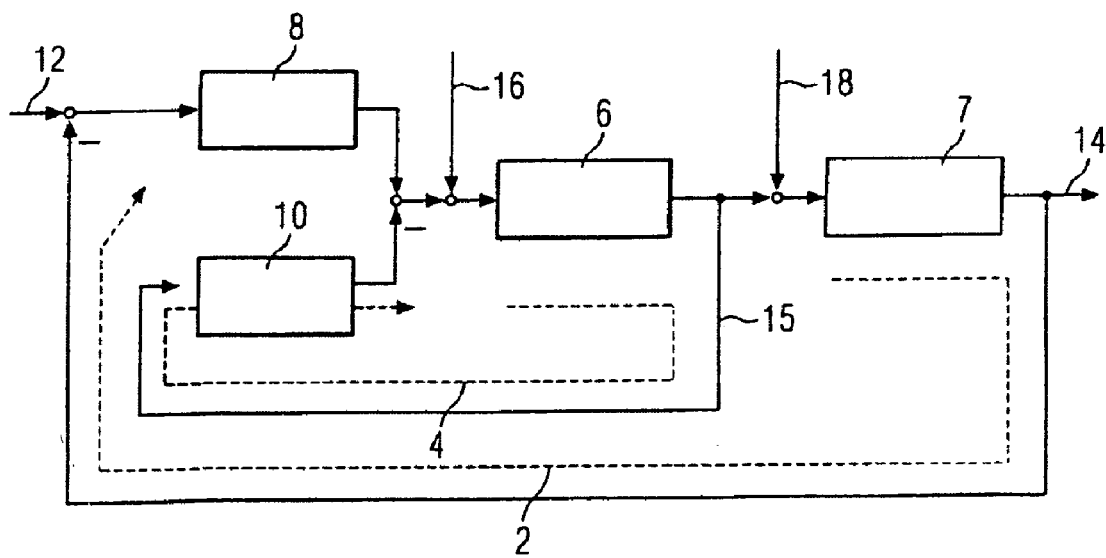
FIG. 9 shows a control with slave control loop.

The representations according to FIG. 7 to FIG. 9 show further embodiments of basic structures of a control system according to the invention. FIGS. 7 to 9 show respectively an auxiliary control loop 3 and a main control loop 2. The auxiliary control loop is controlled by means of the auxiliary controller 10. The main control loop is controlled by means of a main controller 8. The auxiliary controller 10 has, for example, a differential element. In FIGS. 7 to 9, variables as already described in FIG. 6, such as desired value 12, main control variable 14 and auxiliary control variable 15 are additionally used. In the controlled systems 6 and 7, disturbance variables 16 and 18 are represented as additional input signals.

The representation according to FIG. 7 shows the basic structure of a cascade control.

The representation according to FIG. 8 shows the structure of a cascade control having a slave control loop 4.

The representation according to FIG. 9 shows the structure of a control having a slave control loop 4, characterized in that the controllers, i.e. the main controller 8 and the auxiliary controller 10, are not connected in cascade.

What is claimed is:

1. An open-loop control process for the guidance of conveyed material in a conveying device, the conveying device comprising:
    a) a movable means for realizing the conveyance,
    b) a first motion detector for measuring a first actual position value for the movable means and
    c) a second motion detector for measuring a second actual position value for the conveyed material,
    in which the control is realized with a position control having a position control clock and with a speed control having a relatively faster speed control clock, in which, in the position control clock, desired position values are preset as the command variable and, in the speed control clock, registered first actual position values are fed back to the position control and/or speed control, in which the position control is provided, at least in part, in an open-loop control part and the speed control is provided in a drive part, and in which a control variable is fed back into the position control, which control variable is dependent on second actual position values registered in the position control clock, wherein a difference deriving from the first actual position values registered in the speed control clock and the first actual position values registered in the position control clock is fed back as a further control variable to the input side of the speed control.

2. An open-loop control process for the guidance of conveyed material in a conveying device, the conveying device comprising:
 a) a movable means for realizing the conveyance,
 b) a first motion detector for measuring a first actual position value for the movable means and
 c) a second motion detector for measuring a second actual position value for the conveyed material,
 in which the control is realized with a position control having a position control clock and with a speed control having a relatively faster speed control clock, in which, in the position control clock, desired position values are preset as the command variable and, in the speed control clock, registered first actual position values are fed back to the position control and/or speed control, in which the position control is provided, at least in part, in an open-loop control part and the speed control is provided in a drive part, and in which a control variable is fed back into the position control, which control variable is dependent on second actual position values registered in the position control clock, wherein a difference deriving from the first actual position values registered in the speed control clock and the first actual position values registered in the position control clock is fed back as a further control variable to the input side of the speed control, and wherein, as the control variable of the position control, the second actual position values registered in the position controller clock are used.

3. An open-loop control process for the guidance of conveyed material in a conveying device, the conveying device comprising:
 a) a movable means for realizing the conveyance,
 b) a first motion detector for measuring a first actual position value for the movable means and
 c) a second motion detector for measuring a second actual position value for the conveyed material,
 in which the control is realized with a position control having a position control clock and with a speed control having a relatively faster speed control clock, in which, in the position control clock, desired position values are preset as the command variable and, in the speed control clock, registered first actual position values are fed back to the position control and/or speed control, in which the position control is provided, at least in part, in an open-loop control part and the speed control is provided in a drive part, and in which a control variable is fed back into die position control, which control variable is dependent on second actual position values registered in the position control clock and wherein, as the control variable of the position control, a sum is used, the first actual position values registered in the speed controller clock being used as a first addend and a difference deriving from the registered second actual position values and the registered first actual position values being used as a second addend in the position controller clock.

* * * * *